United States Patent Office 3,152,610
Patented Oct. 13, 1964

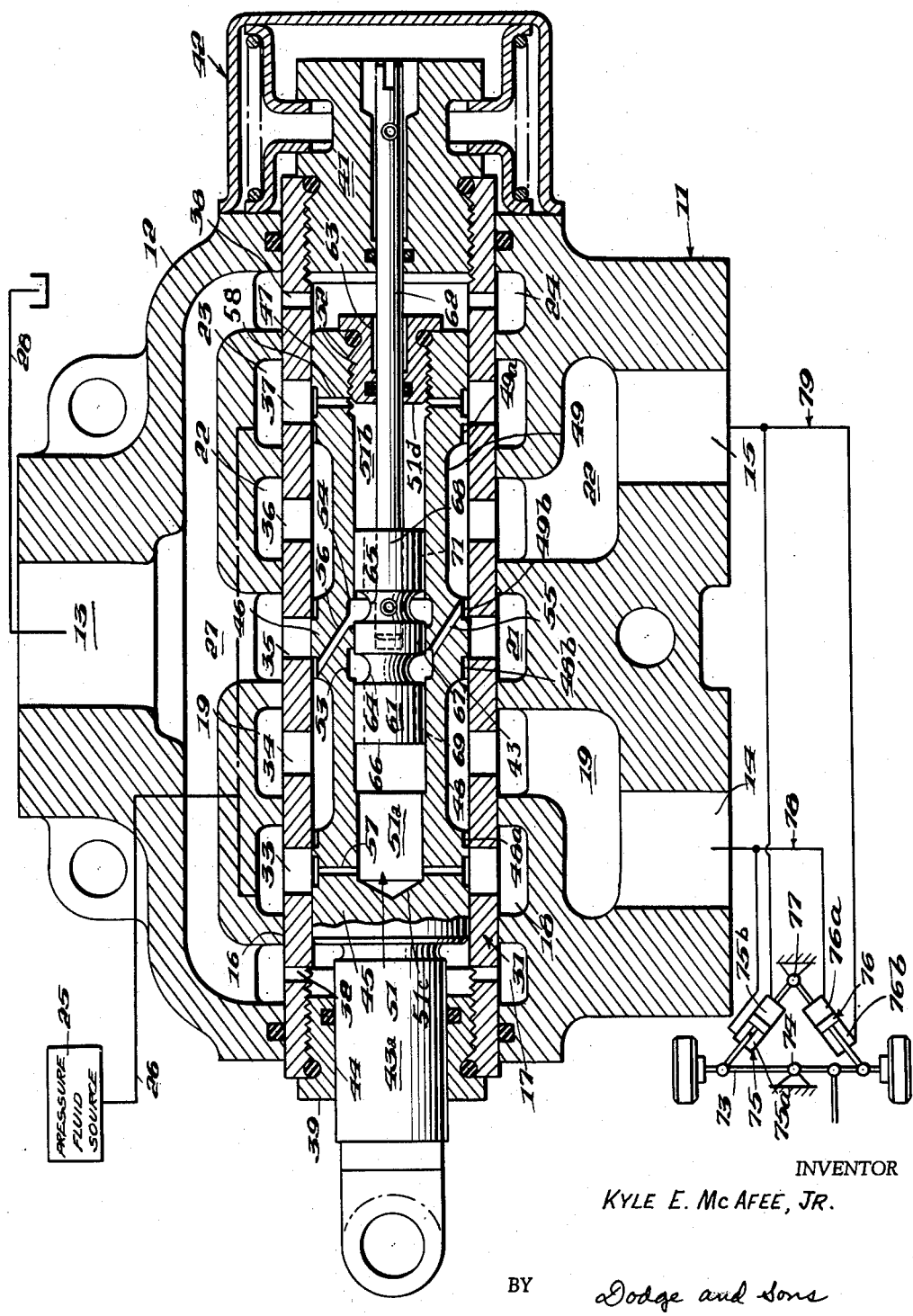

3,152,610
HYDRAULIC DEVICE
Kyle E. McAfee, Jr., Kalamazoo, Mich., assignor to The
New York Air Brake Company, a corporation of New
Jersey
Filed Sept. 11, 1961, Ser. No. 137,376
3 Claims. (Cl. 137—596.2)

This invention relates to a steering valve provided with hydraulic follow-up means for automatically returning the valve to an initial idling condition when the application of a steering input to the valve is terminated.

Steering systems provided with various types of feedback means have been proposed in the past for use with off-the-road mobile equipment. Feedback means of the mechanical type using linkages, lost-motion devices, cams, springs, and the like have proven to be clumsy, awkward, expensive and complex, and often these feedback means fail to reflect the actual conditions which occur in the steering system.

The present invention is directed to a steering control valve provided with hydraulic feedback means for automatically returning the valve to an initial idling condition upon the termination of operator input to the valve. According to one important feature of the invention, improved operator control of the steering system is obtained as a consequence of a "hydraulic feel" which is sensed by the operator as a force resisting movement of an operating plunger of the valve.

The steering valve of the present invention includes a valve housing provide with a bore encircled by an exhaust chamber, a pair of fluid supply chambers, and a pair of motor chambers. The invention is characterized by the provision of a follow-up sleeve slidably mounted in the bore and biased by a centering spring toward a neutral position relative to the housing, said sleeve having a plurality of radial passages therein arranged opposite the housing chambers, respectively, when the sleeve is in the neutral position. An operating plunger is slidably mounted in the sleeve and is provided with a pair of passages which connect the supply chambers with the motor chambers, respectively, when the plunger is in an idling condition relative to the sleeve. The operating plunger is also provided with a pair of grooves which connect one of the supply chambers with one of the motor chambers and the other of the supply chambers with the exhaust chamber when the plunger is displaced from the idling position relative to the sleeve. According to the invention, hydraulic follow-up means are provided for urging the sleeve toward its idling position relative to the plunger during axial movement of the plunger relative to the housing. The hydraulic follow-up means present a "hydraulic feel" which is sensed by the operator as a force resisting axial movement of the plunger from its idling position.

According to another feature of the invention, when all operating forces are removed from the plunger, the spring-centered sleeve serves as an operating member for positioning the plunger in the idling position relative to the sleeve.

Other objects and advantages of the invention will become apparent from a study of the following specification when considered in conjunction with the accompanying drawing whose single figure is a schematic illustration of the hydraulic steering system, the steering valve being shown in axial section.

The steering valve 11 includes a housing 12 provided with an exhaust port 13, a pair of motor ports 14 and 15, and an inlet port, not shown. The housing contains a through bore 16 encircled by seven chambers 17–19 and 21–24. Supply chambers 18 and 23 communicate with a source of pressure fluid 25 via the connection shown schematically by the broken line 26 (which connection includes the housing inlet port and an internal manifold connecting this port with the supply chambers). Sump chambers 17, 21, and 24 communicate with each other and with exhaust port 13 via manifold 27, said exhaust port being connected with sump by conduit 28. Motor chambers 19 and 22 communicate with motor ports 14 and 15, as shown.

Sleeve 31 is slidably mounted in bore 16 and is provided with seven circular series of passages 32–38 that register with the seven housing chambers 17 to 19 and 21 to 24, respectively. The sleeve is closed at each end by threaded plugs 39 and 41 and is biased toward the illustrated neutral position by centering spring assembly 42. Plunger 43 is slidably mounted in sleeve 31 and is provided at one end with a reduced diameter portion 43a which slidably extends through bore 44 and plug 39. Plunger 43 is formed with lands 45, 46 and 47 which are separated by grooves 48 and 49. The opposed edges of lands 45 and 46 contain throttling notches 48a and 48b, respectively, and the opposed edges of lands 46 and 47 contain throttling notches 49b and 49a, respectively. Valve plunger 43 contains an axial bore 51 whose right end is closed by a threaded plug 52 and which is encircled by a pair of chambers 53 and 54 that communicate with grooves 49 and 48, respectively, via cross passages 55 and 56. Radial passages 57 and 58 in lands 45 and 47, respectively, afford communication between working chambers 51a and 51b and sleeve passages 33 and 37, respectively, when the valve plunger and sleeve are in the illustrated neutral position. The cross-sectional areas of passages 57 and 58 are smaller than the cross-sectional areas of cross passages 55 and 56, respectively.

Piston 61 is slidably mounted in bore 51 and is rigidly connected with plug 41 by rod 62 which slidably extends through bore 63 in plug 52. Piston 61 is provided with peripheral grooves 64 and 65 which define lands 66, 67 and 68. Longitudinal through slots 69 and 71 are formed in the outer peripheries of lands 66 and 68, respectively.

The operation of the steering control valve will be described in conjunction with a simple Pitman-linkage steering arrangement consisting of an axle 73 which is pivoted about fixed pivot 74 by a pair of double-acting piston motors 75 and 76. The piston rods of these motors are pivotally connected with axle 73 on opposite sides of pivot 74, and the cylinders are pivotally connected with fixed pivot 77, as shown. Working chambers 75a and 76a of the piston motors are connected with motor port 14 via the branch lines of conduit 78, and the opposed working chambers 75b and 76b are connected with motor port 15 via the branch lines of conduit 79'.

*Operation*

Assuming that valve sleeve 31 is in the illustrated neutral position and that valve plunger 43 is in the idling position relative to the sleeve, the fluid delivered to chambers 18 and 23 via connection 26 flows to sump along two parallel paths, the path from chamber 18 including passages 33 and 57, chamber 51a, slots 69, groove 64, passage 55, notches 49b, passages 35, chamber 21, manifold 27, port 13 and conduit 28, and the path from chamber 23 including passages 37 and 58, chamber 51b, slots 71, groove 65, passage 56, notches 48b, passages 35, chamber 21, manifold 27, port 13 and conduit 28. The back pressure developed by the restricted orifice defined by notches 49b forces fluid to flow from groove 49 to working chambers 75b and 76b through passages 36, chamber 22, port 15 and branched conduit 79. Similarly, the back pressure developed by notches 48b causes fluid to flow also from groove 48 to working chambers 75a and 76a via passages 34, chamber 19, port 14 and branched conduit 78. Assuming that, during idling, chambers 51a and 51b contain fluid at equal pressure, the forces developed by the fluid in working chambers 75a, 75b, 76a and 76b are balanced, and axle 73 is maintained in the illustrated "straight" position. It should be mentioned that centering spring assembly 42 is designed to maintain piston 61 in the illustrated position against the resultant of the idling fluid pressure forces acting on the opposed, unequal working surfaces of the plunger.

Assuming now that it is desired to pivot axle 73 in the counterclockwise direction, the operator shifts valve plunger 43 to the right relative to housing 12 and sleeve 31. This rightward movement of the plunger is opposed by the fluid pressure in chamber 51a, and this opposing force is sensed by the operator as a hydraulic "feel." As plunger 43 moves to the right from its idling position relative to sleeve 31, land 46 closes the venting path through notches 49b, and motor chamber 22 is brought into communication with supply chamber 23 via passages 37, notches 49a, groove 49, and passages 36. The pressure of the fluid in chambers 22, 75b, 76b and 51a quickly rises to system pressure. The movement of plunger 43 to the right also causes the flow through notches 48b to progressively increase with the result that the fluid pressure in chambers 19, 51b, 75a, and 76a progressively decreases. The pressure differential between the opposed working chambers of motor 75 and 76 causes these motors to move axle 73 in the counterclockwise direction. Furthermore, because of the presence of the hydraulic feedback afforded by the present invention, the pressure differential between chambers 51a, and 51b causes piston 61 and sleeve 31 to be shifted to the right (i.e., toward its idling position relative to plunger 43) against the counteracting force developed by the centering spring assembly 42. As long as the operator continues to displace plunger 43 to the right at a rate sufficient to maintain the vent path through notches 49b closed and the supply path through notches 49a open, the pressure differential between chambers 51a and 51b causes a corresponding following movement of piston 61 and sleeve 31 to the right (i.e., in a direction tending to re-establish the initial idling porting relationship).

The pressure differentials established in the opposed working chambers of motors 75 and 76 cause the motors to continue to pivot axle 73 in the counterclockwise direction as long as plunger 43 is displaced to the right from its idling position relative to the sleeve.

When the operator ceases to shift plunger 43 to the right, piston 61 and sleeve 31 continue to be shifted to the right (as a result of the pressure differential between chambers 51a and 51b) against the counteracting force of spring assembly 42 until the vent path through notches 49b is opened and the supply path through notches 49a is closed. The idling porting relationship is re-established and the pressure differential between chamber 51a and 51b, 75a and 75b, and 76a and 76b, respectively, progressively decreases to zero. Axle 73 will have been pivoted in the counterclockwise direction through an angle proportional to the extent of movement of plunger 43 to the right relatively to housing 12. Assuming that plunger 43 is held in this shifted position, sleeve 31 and piston 61 are shifted to the left by centering spring assembly 42 with the result that notches 49b and 49a are again closed and opened, respectively. The pressure differential between chambers 51a and 51b will be re-established and sleeve 31 is again shifted to the right to its idling position relative to piston 43. Hunting of sleeve 31 about its idling position relative to the plunger 43 and hunting of axle 73 about its position is minimized by close control of the throttling notches on plunger 43.

It is important to note that upon the release of operating plunger 43, sleeve 31 and piston 61 are returned to the illustrated neutral position by centering spring assembly 42, the axle 73 being maintained substantially stationary in its current position. Thus as sleeve 31 is shifted to the left from its idling position relative to plunger 43 by spring assembly 42, notches 49b and 49a are closed and opened, respectively, and a pressure differential is again established between working chambers 51a and 51b. The pressure differential develops a force on the left hand surface 51c of chamber 51a, and since plunger 43 is released, it is shifted to the left toward the idling position relative to sleeve 31. This leftward movement of sleeve 31 and plunger 43 continues until the sleeve is centered in the neutral position by the spring and the plunger is returned to the idling position relative to the sleeve. The pressure differential between chambers 51a and 51b required to produce this following movement of valve plunger 43 is small and exists for only a short period of time. Therefore, during the return movement of the valve members, the motors 75 and 76 do not materially alter the position of axle 73.

In order to pivot axle 73 in the clockwise direction, plunger 43 is shifted to the left against the opposing hydraulic "feel" force developed in chamber 51b from its idling position relative to sleeve 31. It should be mentioned that this movement of plunger 43 to the left from the idling position relative to sleeve 31 can occur at any time regardless of the position of the sleeve relative to housing 12. As plunger 43 is shifted to the left relative to sleeve 31, notches 48b and 48a are closed and opened, respectively, with the result that the pressure in chambers 19, 51b, 75a and 76a rises to system pressure and the pressure in chambers 22, 51a, 75b and 76b decreases. The pressure differential between the opposed working chambers of motors 75 and 76 effects clockwise pivotal movement of axle 73 through an angle proportional to the extent of the leftward travel of the operating plunger. The pressure differential between working chambers 51b and 51a causes piston 61 to shift sleeve 31 to the left toward the idling position relative to plunger 43. When the sleeve reaches the idling position, notches 48b and 48a are opened and closed, respectively, with the result that the pressures in the working chambers are again balanced. Once valve plunger 43 is brought to rest and held in an actuated position, then, as explained above, valve sleeve 31 will remain in an idling position with respect to it and axle 73 will remain in its new position. Any rightward movement of the sleeve 31 from this relative position under the action of centering spring assembly 42, immediately closes and opens notches 48b and 48a, respectively, and creates a pressure differential between chambers 51b and 51a that causes piston 61 to return the sleeve to the idling position.

When the force holding valve plunger 43 in an actuated position is released, the pressure differential between chambers 51a and 51b, which, accompanies rightward movement of sleeve 31 under the action of centering spring assembly 42, develops a net shifting force on plunger 43 that causes the plunger to follow the sleeve. As explained previously, the sleeve 31 now moves back to the neutral position with respect to the housing and the valve plunger 43 assumes an idling position. During this return movement, axle 73 remains stationary.

Although the hydraulic feedback device has been described in connection with a steering valve, the invention is equally suitable for use with conventional servo valves wherein mechanical feedback is not permissible owing to particular design details.

While the preferred embodiment of the invention has been illustrated and described, it will be apparent to those skilled in the art that various changes and modifications may be made in the apparatus described without deviating from the invention set forth in the following claims.

What is claimed is:
1. A control valve comprising
   (a) a housing containing inlet, exhaust, and first and second motor ports;
   (b) a pair of valve elements in the housing, each being movable in reverse directions from a relative idling position, relative movement of the elements in one direction with respect to the idling position causing means carried by the elements and the housing to isolate the inlet port from the exhaust port, to connect the first motor port with the inlet port and to connect the second motor port with the exhaust port, and relative movement of the elements in the opposite direction with respect to the idling position causing means carried by the elements and the housing to isolate the inlet port from the exhaust port, to connect the first motor port with the exhaust port and to connect the second motor port with the inlet port;

(c) actuating means for shifting one of the valve elements;

(d) centering means biasing the other valve element toward a neutral position with respect to the housing;

(e) first motor means including a working chamber and movable reaction surfaces carried by both valve elements, the reaction surfaces being arranged to move the elements in said one direction with respect to the idling position;

(f) second motor means including a working chamber and movable reaction surfaces carried by both valve elements, the reaction surfaces being arranged to move the elements in said opposite direction with respect to the idling position; and (g) means for connecting the working chambers of the second and first motor means with the inlet and exhaust ports, respectively, when one of the valve elements move from said idling position in said one direction, and for connecting the working chambers of the first and second motor means with the inlet and exhaust ports, respectively, when one of the valve elements moves from said idling position in said opposite direction.

2. A control valve comprising (a) a housing containing a valve bore intersected by five longitudinally spaced chambers, there being an exhaust chamber, first and second supply chambers located on opposite sides of the exhaust chamber, and first and second motor chambers located between the exhaust chamber and the first and second supply chambers, respectively;

(b) a valve sleeve reciprocable in the valve bore and containing longitudinally spaced through ports which register with the five chambers;

(c) centering spring means biasing the valve sleeve to a neutral position relative to the housing;

(d) a valve plunger reciprocable in the valve sleeve and formed with a central land that separates a pair of spaced grooves, the valve plunger and sleeve being shiftable relative to each other in one relative direction from an idling position to cause one groove to interconnect the through ports registering with the first motor and supply chambers and the other groove to interconnect the through ports registering with the second motor chamber and the exhaust chamber, and being shiftable relatively to each other in the opposite relative direction from said idling position to cause said one groove to interconnect the through ports registering with the first motor chamber and the exhaust chamber and the said other groove to interconnect the through ports registering with the second motor and supply chambers;

(e) first motor means defined by means carried by the valve plunger and the sleeve and including a working chamber and a pair of reaction surfaces connected with the plunger and the sleeve, the reaction surfaces being arranged to urge the valve plunger and the sleeve in said one relative direction;

(f) second motor means defined by means carried by the valve plunger and the sleeve and including a working chamber and a pair of reaction surfaces connected with the plunger and the sleeve, the reaction surfaces being arranged to urge the valve plunger and the sleeve in said opposite relative direction;

(g) first passage means connecting the working chamber of the first motor means with said other groove; and (h) second passage means connecting the working chamber of the second motor means with said one groove.

3. The control valve defined in claim 2 in which the first and second motor means are defined by (a) an axial bore formed in the valve plunger;

(b) first and second end walls closing the opposite ends of the axial bore;

(c) a piston reciprocable in the axial bore and dividing it into first and second compartments, the piston having first and second ends which face the first and second end walls, respectively; and (d) means extending through the first end wall and rigidly connecting the piston with the valve sleeve, (e) said first compartment and said first end wall and first end constituting the working chamber and the reaction surfaces, respectively, of the first motor means, and (f) said second compartment and said second end wall and second end constituting the working chamber and the reaction surfaces, respectively, of the second motor means.

References Cited in the file of this patent

UNITED STATES PATENTS

| | | |
|---|---|---|
| 2,297,213 | Gosslad et al. | Sept. 29, 1942 |
| 2,654,347 | Clark | Oct. 6, 1953 |
| 2,667,146 | Wheeler | Jan. 26, 1954 |
| 2,729,940 | Walker | Jan. 10, 1956 |
| 2,774,025 | Abram et al. | Dec. 11, 1956 |
| 3,053,052 | Garrison et al. | Sept. 11, 1962 |